Nov. 18, 1952 P. K. WEIMER 2,618,700

COLOR TELEVISION SYSTEM

Filed June 18, 1948 2 SHEETS—SHEET 1

INVENTOR
Paul K. Weimer
BY
[signature] Mitchell
ATTORNEY

INVENTOR
Paul K. Weimer
BY
[signature] C. Mitchell
ATTORNEY

Patented Nov. 18, 1952 2,618,700

UNITED STATES PATENT OFFICE 2,618,700

COLOR TELEVISION SYSTEM

Paul K. Weimer, Princeton, N. J., assignor to Radio Corporation of America, a corporation of Delaware Application June 18, 1948, Serial No. 33,721

12 Claims. (Cl. 178—5.4)

This invention relates to color television and more particularly to image pickup devices and their associated circuit arrangements.

In an effort to overcome the difficulties resulting from misregistration of selected component color images, there have been proposed a number of arrangements wherein target structures of the image pickup devices are divided into a number of extremely small sections representative of one of a plurality of selected color components of the image of an object being scanned.

In the copending U. S. application of Alfred C. Schroeder, Serial No. 667,435, filed May 4, 1946, an image pickup device of the high velocity beam scanning type such as the iconoscope or image iconoscope is provided with a target structure which is divided into a large number of elemental strips electrically insulated from one another and arranged together with appropriate color filters or color sensitive photoelectric material to produce selected component color signals suitable for transmission in a simultaneous type system.

Although such an arrangement as proposed by Schroeder has many advantages and is generally satisfactory for the reproduction of simultaneous type color television signals, there are certain improvements which can be made in regard to inter-electrode capacity of the various target elements.

A further advantage may be gained over the system proposed by Schroeder by the employment of an electron multiplier in the image pickup tube. This latter feature is important in that greater signal strengths and more satisfactory service with full illumination can be realized.

The advantages of electron multipliers in image pickup devices are well known to the art and are well shown and described in the publications on the image orthicon type of image pickup tube, such as an article by Albert Rose, P. K. Weimer and H. B. Law entitled "The Image Orthicon, A Sensitive Television Pickup Tube," published in the "Proceedings of the Institute of Radio Engineers" for July, 1946.

The employment of a multiple element type of target structure in a color television system has been proposed by Albert Rose in the copending U. S. application entitled "Color Television System," Serial No. 787,212, filed November 20, 1947 (D-30058), and in another copending U. S. application of Albert Rose entitled "Color Television System," Serial No. 787,211, filed November 20, 1947 (D-25794).

The first application of Albert Rose referred to above provides a simultaneous television image pickup arrangement employing an image pickup tube having a plurality of different color responsive and electrically modulatable electrodes. A signal channel for each component color is connected to the image pickup tube and each of the signal channels is made responsive to a predetermined range of frequencies. Each of the color responsive electrodes is then electrically modulated to provide carrier signals for each color channel.

According to the latter identified application of Albert Rose, an image pickup tube is employed which is selectively responsive by electrical control of its target electrode to any of a plurality of different selected component color images. A signal channel for each of the selected component colors is provided, and a keying circuit controllably connected to the electrodes and the signal channels makes the electrode and the corresponding channel operative together only during predetermined sequentially recurring time intervals which may, for example, be at an elemental sequential rate.

In the copending applications of Albert Rose referred to immediately above, advantage is taken of the signal gain obtainable with the electron multipliers in connection with an orthicon or image orthicon type of tube.

It is difficult, however, to construct a target electrode wherein interleaved groups of elements thereof are provided with sufficient insulation to prevent electrical breakdown.

According to this invention, an arrangement is provided wherein advantage is taken of the amplification characteristics of the electron multiplier and a target electrode structure is employed which does not require electrical insulation between interleaved groups of selected component color representative elements.

According to this invention, a television system is provided including an image pickup tube of the type wherein signal energy is obtained from electrons returning from the image target area of the image pickup tube, and the direction of movement of the electrons returning from the image target area is controlled in accordance with different intelligence information such as different selected component colors of a color image. A plurality of independent means is then employed for collecting the differently directed groups of electrons returning from the image target area, and means are provided for converting the groups of electrons into image signal trains for employment in the transmission of images in substantially their natural color.

A primary object of this invention is to provide an improved color television system.

Another object of this invention is to provide for the transmission of the simultaneous type color television signals without the problems of image registry.

Another object of this invention is to provide a compact arrangement of a color image pickup tube and its associated circuit elements.

Other and incidental objects of the invention will be apparent those skilled in the art from a reading of the following specification and an inspection of the accompanying drawing in which.

Figures 1, 3:
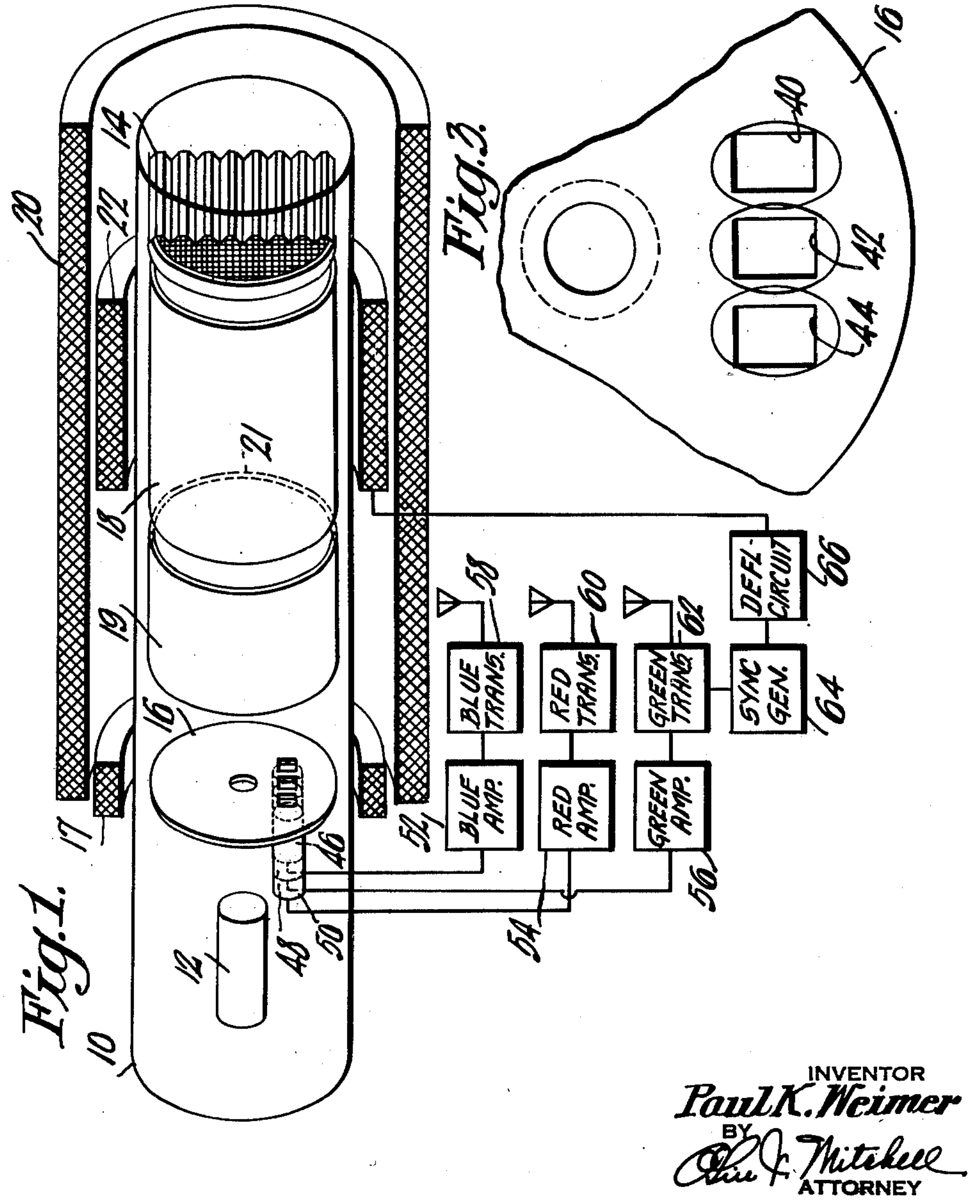
Figure 1 shows schematically and by block diagram one form of this invention.
Figure 3 shows in detail one form of apertured electrode suitable for use in connection with the type of target electrode illustrated in Figure 2.

Figure 1 discloses a color television system. The pickup tube comprises an evacuated envelope 10 having mounted at one end thereof a conventional type electron gun 12 for producing and directing a beam of electrons coaxially along the tube toward a target structure 14.

The electron beam from the gun structure 12 is directed through an apertured electrode 16 maintained at a positive potential during tube operation. A second cylindrical anode electrode 18 spaced from the apertured disk 16 maintains the electron beam at uniform velocity as it approaches the target structure 14.

A solenoid 20 surrounds the tube envelope 10 and encloses the tube essentially along the path of the electron beam between the gun 12 and target 14. The magnetic field of the solenoid 20 is essentially parallel to the axis of the tube and tends to maintain the electron beam normal to the target surface during tube operation.

A yoke 22 is coaxially mounted around the tube envelope 10. The yoke 22 comprises essentially two pairs of magnetic coils for generating a pair of scanning fields perpendicular to each other and to the axis of the tube. These pairs of magnetic coils of yoke 22 are connected to well known sawtooth generators for providing the scanning fields of appropriate form for providing both line and frame scansion of the target 14 by the electron beam of gun 12.

Figure 2:
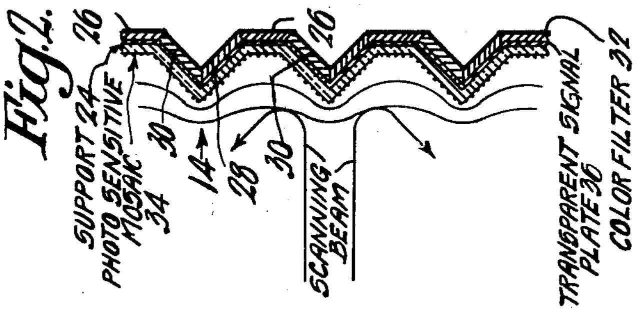
Figure 2 shows in detail one suitable target structure usable in the practice of this invention.

The target 14 is shown in detail in Figure 2 and comprises essentially a corrugated glass sheet 24, as shown in the figure. The corrugations are such that portions 26 are formed essentially in a common plane, while portions 28 and 30 are formed between the portions 26 and at an angle to each other and the portions 26. Thus, the portions 26, 28 and 30 are in different planes, the portions 28 and 30 being in parallel planes respectively.

The glass target 24 is essentially a clear piece of glass, and on the back of the target is fixed a color filter shown at 32. Each portion of the filter 32 covering successive portions of the target surface is adapted to pass light of a different color, as, for example, the portions of the filter 32 covering the co-planar target portions 26 may pass only green light, while the filter portion covering the target portions 28 is adapted to pass blue light only, and also, the filter portions covering the target surfaces 30 are adapted to pass red light only. The opposite surface of the glass target 24 is coated with a photosensitive layer 34, which is sensitive to light passing through any of the three types of color filters used.

Prior to the application of the light filter layer 22 on the back of the glass target surface, there is applied a transparent metal signal plate 36 which may be formed by "sputtering" on to the target surface of any appropriate metal, such as, for example, palladium.

Although in the form of the invention shown the signal plate is positioned between the support and the color filter, the position of the signal plate and the color filters may be interchanged.

During tube operation, the potential of the signal plate 36 is preferably maintained at the potential of the cathode of the electron gun 12.

In the operation of this tube of Figure 1, a scene to be televised is focused upon the target 14 through the adjacent end of the tube envelope 10. Due to the target structure, light from the scene is broken up into component parts of the three colors as the light from the scene passes through each filter onto the corresponding photosensitive surface. In this manner there is an emission of electrons from each portion of the photo surface 34 corresponding to the intensity of the light striking the target surface.

The electron emission from each elemental area of the photosensitive layer 34 will provide on the target surface a positive charge pattern corresponding from point to point with the optical scene focused upon the target 14. The electron beam as it is scanned over the target surface is slowed down to almost zero velocity at the target surface due to the retarding field established by the signal plate 36 maintained at cathode potential.

As the electron beam scans across the target surface, the positive areas of the photoelectric surface 34 will be discharged by the beam to approximately the gun cathode potential. Due to the low velocity of the electron beam, the residual portion of the beam not used to discharge the target surface is reflected back along the axis of the tube and forms a return beam modulated by the subtraction of electrons used for discharging the positive areas of the target surface.

The specific target structure used here is for the purpose of breaking up the return beam into its three color components.

The corrugation structure of the target surface shown in Figure 2 is such that the electrostatic field in front of all of target portions 28, for example, will direct the return beam in one direction, while the field in front of target portions 26 will direct the beam in a second direction, and the field in front of target portions 30 will cause the return beam to follow a third direction. Thus, as the electron beam scans the target surface, the modulated return beam is divided into three portions, each corresponding to a different colored portion of the target surface. At certain points in the return beam, the magnetic field causes these three portions to be spaced apart from one another. By properly placing an apertured plate 16 and by adjustment of the voltage on the lifter plates 19 and 21, these three components may be each directed into a separate electron multiplier.

The apertured plate 16 has three openings 40, 42 and 44 arranged for the passage therethrough of a corresponding portion of the divided return beam. Aligned with each aperture and on the opposite side of plate 16 from the target are corresponding multiplier sections 46, 48 and 50, into which the corresponding portion of the return beam is directed. Each multiplier in turn amplifies the modulated signal of the return beam and is connected into corresponding amplifying circuits 52, 54 and 56. The output of the amplifying circuits is connected to appropriate signal transmitters 58, 60 and 62. Appropriate synchronizing arrangements including the synchronizing signal generator 64, together with local deflecting circuits 66, are included as illustrated.

Figures 4, 5, 6, 7, 8, 9:
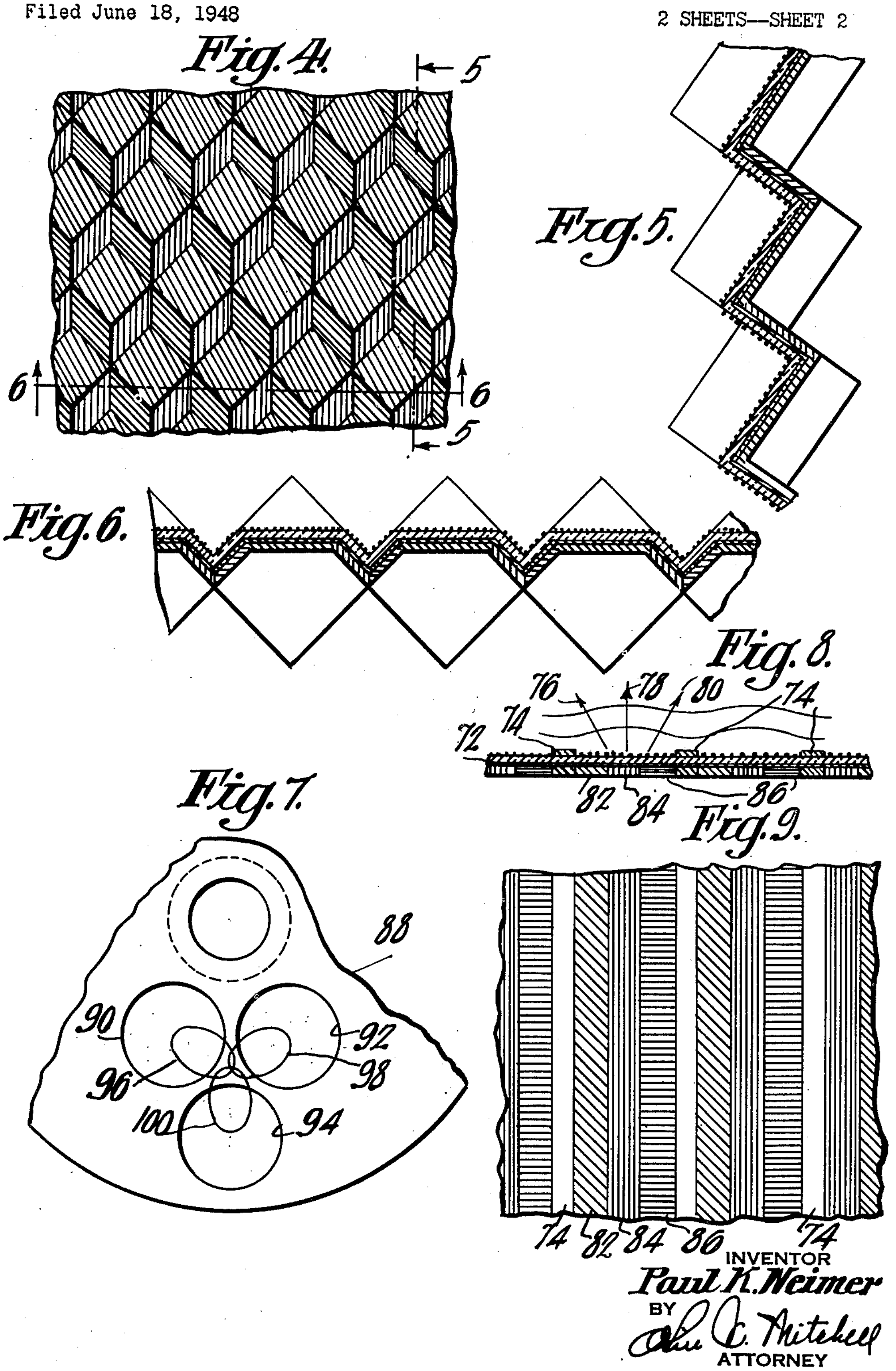
Figure 4 illustrates schematically another form of target electrode suitable for employment in the practice of this invention.
Figures 5 and 6 show different elevations of the target structure illustrated in Figure 4.
Figure 7 shows another form of apertured electrode which is suitable for employment with the type of target structure shown in Figure 4.
Figures 8 and 9 show schematically still another form of target electrode suitable for operation in the present invention.

Turning now in detail to Figures 8 and 9, there is illustrated another form of target electrode which is applicable for employment in the practice of this invention.

It will be remembered in connection with the explanation of the operation of the target electrode of Figure 2 that the corrugated shape of the support member and its associated element causes the electric field in front of the target to have a different direction in front of each color element. The lines of force resulting from the electric field will therefore be in different directions.

By utilizing a plane target support element 72 as illustrated in Figure 8 and mounting thereon a series of spaced conducting strips 74, it is also possible to establish an electric field whose force is directed in different directions, as illustrated by arrows 76, 78 and 80.

By close examination of the structure shown in Figure 8, it will be seen that the direction of electric force opposite the blue filter 82 will be to the left, while the electric force opposite the green filter 84 will be upward. It follows that the force opposite the red filter 86 will be to the right.

Another view of the target arrangement of Figure 8 is shown in Figure 9, wherein like numerals represent similar elements.

The apertured electrode shown in connection with the explanation of the operation of target electrode 2 will operate satisfactorily with a target electrode of the type shown in Figures 8 and 9.

There is still another form of this invention wherein the electrons returning from the target are oriented in groups separated by 120°. This may be accomplished by employment of a target of the type shown in Figure 4.

The target shown in Figure 4 is essentially a pyramid surface wherein the base of the pyramid extends to form another pyramid, or it might be described in shape as the surfaces of a series of adjoining cubes.

In order to more clearly explain the shape of the target structure of Figure 4, sectional views of Figures 5 and 6 are included.

In Figure 6, the detail structure may be seen. Reading from top to bottom, a mosaic of the usual type is supported by a suitable support such as glass or mica. A signal plate is mounted on the bottom of the support and appropriately colored filter elements are mounted on the bottom of the signal plate.

It is important, however, to note that all surfaces in parallel planes have like colored filter sections. This will cause, in accordance with the explanation of the operation of this invention as outlined above, the direction of the return beam to take a path dependent upon the color of the section from which it is returned.

Turning now to Figure 7, there is shown an apertured electrode suitable for use with the type of target electrode shown in Figure 4 above.

It will be remembered that the return paths of the electron returning from the target of the structure of Figure 4 will be separated by 120°. It is therefore necessary that the apertures of the apertured electrode 88 be spaced by 120° as shown by numerals 90, 92 and 94.

The position of impact against the apertured electrode 88 of the returning electrons is illustrated by ellipses 96, 98 and 100.

It will be seen that the amount of electrons falling in the apertures 90, 92 and 94 will depend upon the number of electrons returning to positions 96, 98 and 100.

An advantage of this invention may be found in the fact that the elemental structure of the target area may be smaller than the size of the scanning spot and in this way provide three continuous or simultaneous component color representative signal trains. The system may, however, be operated in the familiar elemental sequential fashion by appropriately choosing the size of the elemental structure of the electrodes such that the individual elements of the target are larger than the spot size.

The operation of the tube described in Figure 1 and its associated structures shown in Figures 2 through 9 relates to the well known television pickup tube known as the orthicon, in which the magnetic focusing coil 28 maintains the scanning electron beam essentially normal to the target surface during tube operation. An alignment coil 17 coaxially mounted on the tube envelope 10 maintains a magnetic field, the rotation of which will align the electron beam of gun 12 with the tube axis.

However, the structures shown in Figures 1 through 9 may also be utilized in another form of television pickup tube known as the isocon and which is described in my copending U. S. application, Serial No. 792,944, filed December 20, 1947 (RCR-3016). In this type of tube, the electron beam is given a slight amount of helical motion by means of an alignment coil so that the beam approaches a target at a slight angle. The return beam consists of two types of electrons, those which are reflected from the targets without striking the target and those which are scattered by the target. In the isocon tube only the scattered electrons are admitted to the multiplier, giving a more noise-free signal than that of the image orthicon.

In operating the tube shown in Figure 3 as an isocon, the beam is given helical motion by means of the alignment coil 17 so that the scanning beam strikes the target at a slight angle with the plane of incidence parallel to the corrugation. The return beam is adjusted by means of the lifter plates 19 and 21 so that it strikes the edge of the three apertures 40, 42 and 44. In this way only the scattered electrons are admitted to the three multipliers and improved signal-to-noise ratio results.

Having thus described the invention, what is claimed is:

1. A television image pickup tube of the type wherein signal energy is obtained from electrons returning from the scanned image target area of the image pickup tube, said tube having an irregularity included in said target area for controlling the direction of movement of the electrons returning from said scanned image target area in accordance with different intelligence information, a plurality of independent means for collecting the differently directed groups of electrons returning from said image target area, and means for converting said groups of electrons into signal trains.

2. A television image pickup tube of the type wherein signal energy is obtained from electrons returning from the image target area of the image pickup tube, said image pick-up tube characterized in that a portion of said target area is inclined to normal for controlling the direction of movement of the electrons returning from said image target area in accordance with different intelligence information on said inclined portion, a plurality of independent means for collecting the differently directed groups of electrons returning from said image target area, and separate signal transmission channels connected to each of said latter means.

3. A color television system comprising in combination an image pickup tube having different target areas responsive to different selected component colors, means for controlling the direction of movement of the electrons reflected from said image target area in accordance with the different color response, a plurality of independent means for collecting the differently directed groups of electrons returning from said image target area, and means for converting said groups of electrons into signal trains .

4. A color television image pickup tube having a scanning target consisting of mosaic surfaces positioned in a plurality of unparallel planes, means for directing a scanning beam at said target, a plurality of independent means physically displaced from each other for collecting the differently directed groups of electrons returning from said image target area, and means for converting said groups of electrons into signal trains.

5. A color television system comprising in combination an image pickup tube of the type wherein signal energy is obtained from electrons returning from the image target area of the image pickup tube, said target area consisting of multiple surfaces positioned in a plurality of unparallel planes, the target area of each plane responsive only to one different selected component color, means for controlling the direction of movement of the electrons returning from said image target area in accordance with the different plane from which it is reflected, a plurality of independent means for collecting the differently directed groups of electrons returning from said image target area, and means for converting said groups of electrons into signal trains.

6. A color television system comprising in combination an image pickup tube of the type wherein signal energy is obtained from electrons returning from the image target area of the image pickup tube, means for reflecting the electrons at said image target area in a direction in accordance with different selected component color information, a plurality of independent means for collecting the differently directed groups of electrons returning from said image target area, and means for converting said groups of electrons into signal trains.

7. A color television system comprising in combination an image pickup tube of the low velocity scanning type wherein signal energy is obtained from electrons returning from the image target area of the image pickup tube, means for dividing the returning electrons at said image target area in accordance with different selected component color information, a plurality of independent means for collecting the divided groups of electrons returning from said image target area, and means for converting said groups of electrons into signal trains.

8. A color television system comprising in combination an image pickup tube of the type wherein signal energy is obtained from electrons returning from the image target area of the image pickup tube, means for differently reflecting the electrons at said target area in accordance with different color intelligence for controlling the direction of movement of the electrons returning from said image target area in accordance with different color intelligence information, and means for converting said differently directed groups of electrons into separate signal trains.

9. A color television system comprising in combination an image pickup tube of the type wherein signal energy is obtained from electrons returning from the image target area of the image pickup tube, means consisting of an irregular target area for controlling the direction of movement of the electrons returning from said image target area in accordance with different color intelligence information, a plurality of independent means for collecting the differently directed groups of electrons returning from said image target area, and means for converting said groups of electrons into signal trains.

10. A color television image pickup tube of the type wherein signal energy is obtained from electrons returning from the scanned image target area of the image pickup tube including means for controlling the direction of movement of the electrons returning from said scanned image target area in accordance with different intelligence information, said direction controlling means consisting of a charge pattern positioned at said target area and having an irregular equipotential surface, a plurality of independent means for collecting the differently directed groups of electrons returning from said image target area, and means for converting said groups of electrons into signal trains.

11. A color television image pickup tube of the type wherein signal energy is obtained from electrons returning from the scanning target area of the image pickup tube, said tube including means for controlling the direction of movement of the electrons returning from said scanning target area in accordance with different intelligence information, said direction controlling means consisting of a charge pattern positioned at said target area and having a surface area contained in a plurality of planes, each plane positioned at an angle with each other, and means for converting said differently directed groups of electrons into separate signal trains.

12. A color television image pickup tube of the type wherein signal energy is obtained from electrons returning from the electron beam scanned target of the image pickup tube, said image pickup tube including means for controlling the direction of movement of the electrons returning from said target in accordance with different intelligence information, said direction controlling means consisting of an electron beam impact surface having a surface area contained in a plurality of planes, each plane positioned at an angle with each other, and means for converting said differently directed groups of electrons into separate signal trains.

PAUL K. WEIMER.

REFERENCES CITED

The following references are of record in the file of this patent:

UNITED STATES PATENTS

| Number | Name | Date |
|---|---|---|
| 2,294,820 | Wilson | Sept. 1, 1942 |
| 2,296,908 | Crosby | Sept. 29, 1942 |
| 2,335,180 | Goldsmith | Nov. 23, 1943 |